June 27, 1950 E. K. SMITH 2,513,255
GRID CONTROL METAL ENVELOPE GAS TUBE
Filed March 3, 1948 3 Sheets-Sheet 1

INVENTOR.
E. K. Smith,
BY Neil W. Preston,
his ATTORNEY

June 27, 1950

E. K. SMITH 2,513,255

GRID CONTROL METAL ENVELOPE GAS TUBE

Filed March 3, 1948

INVENTOR.
E. K. Smith,
BY Neil W. Alston,
his ATTORNEY

June 27, 1950  E. K. SMITH  2,513,255
GRID CONTROL METAL ENVELOPE GAS TUBE
Filed March 3, 1948  3 Sheets-Sheet 3

INVENTOR.
E. K. Smith,
BY Neil W. Preston,
his ATTORNEY

Patented June 27, 1950

2,513,255

UNITED STATES PATENT OFFICE 2,513,255

GRID CONTROL METAL ENVELOPE GAS TUBE

Earl K. Smith, West Orange, N. J., assignor to Electrons, Incorporated, Newark, N. J., a corporation of Delaware Application March 3, 1948, Serial No. 12,725

23 Claims. (Cl. 250—27.5)

This invention relates to controllable gaseous discharge tubes of the hot cathode type, and more particularly to air cooled gas filled tubes for the higher range of continuous current ratings.

A grid control gas filled tube of the type contemplated comprises in general a heat shielded hot cathode, control grid and an anode in a thoroughly degassed and evacuated envelope containing a filling of some rare gas, such as Xenon. The electron bombardment of the anode during conduction through such a tube tends to heat the anode; and in order that a tube may operate satisfactorily, it is necessary to provide adequate facilities for dissipating this heat from the anode. In tubes for the lower range of continuous current rating and having glass envelopes, the anode heat may be dissipated by radiation through the envelope and conduction through supporting elements; but in tubes for the higher continuous current ratings additional cooling facilities are required to keep the anode temperature within tolerable limits. In the type of tube contemplated, such additional heat dissipation facilities for the anode are obtained by making the metal anode a part of the tube envelope, and providing extensive external heat radiating surface for the anode in the form of cooling fins or the like on the anode or a separate radiator, so that the anode temperature may be maintained within tolerable limits by direct air cooling, with or without forced draft.

The application of a suitable control element or grid to a gas filled tube of this type for high continuous current ratings, presents a number of problems and difficulties, primarily on account of the environment of relatively high temperature in which the grid must perform its controlling function. Among other things, the grid under such conditions tends to become overheated and emissive to an extent that it loses control; and special expedients are necessary in connection with the structural organization and arrangement of parts to counteract such tendency.

The general object of this invention is to provide a structural combination and arrangement of parts suitable for an air cooled gas filled grid control tube capable of handling relatively large continuous currents.

One specific object of the invention is to provide a structure and mounting of a control grid which is associated with an air cooled anode, and which by reason of its operating temperature and the non-emissive character of its surface will perform its controlling function properly in a tube having a relatively high continuous current rating, such as in the order of 60 amperes.

Another object of the invention is to provide in a tube of the type contemplated a coating or surface treatment for the anode made of a metal suitable for forming a vitreous seal, so as to limit the electron emission from the active surface of the anode at the operating temperature it assumes, and thereby obtain more satisfactory operation and longer tube life.

Generally speaking, and without attempting to define the nature and scope of the invention, it is proposed to employ a control grid having a structure and relationship to an air cooled anode, together with a surface treatment or coating for such grid, that it will satisfactorily perform its controlling function in spite of the relatively high temperature which it assumes in tubes of the higher continuous current ratings, and also employ an auxiliary coating for the active surface of the iron anode preferably employed, so as to restrict electron emission from the active surface of such an anode.

Various other objects, characteristic features, attributes and advantages of the invention will be in part apparent, and in part pointed out, as the description of a typical embodiment of the invention progresses.

In order to facilitate an explanation and understanding of the characteristic features of this invention, one preferred type of construction representing a typical embodiment of the invention has been illustrated in the accompanying drawings.

In these drawings.

Figure 1:
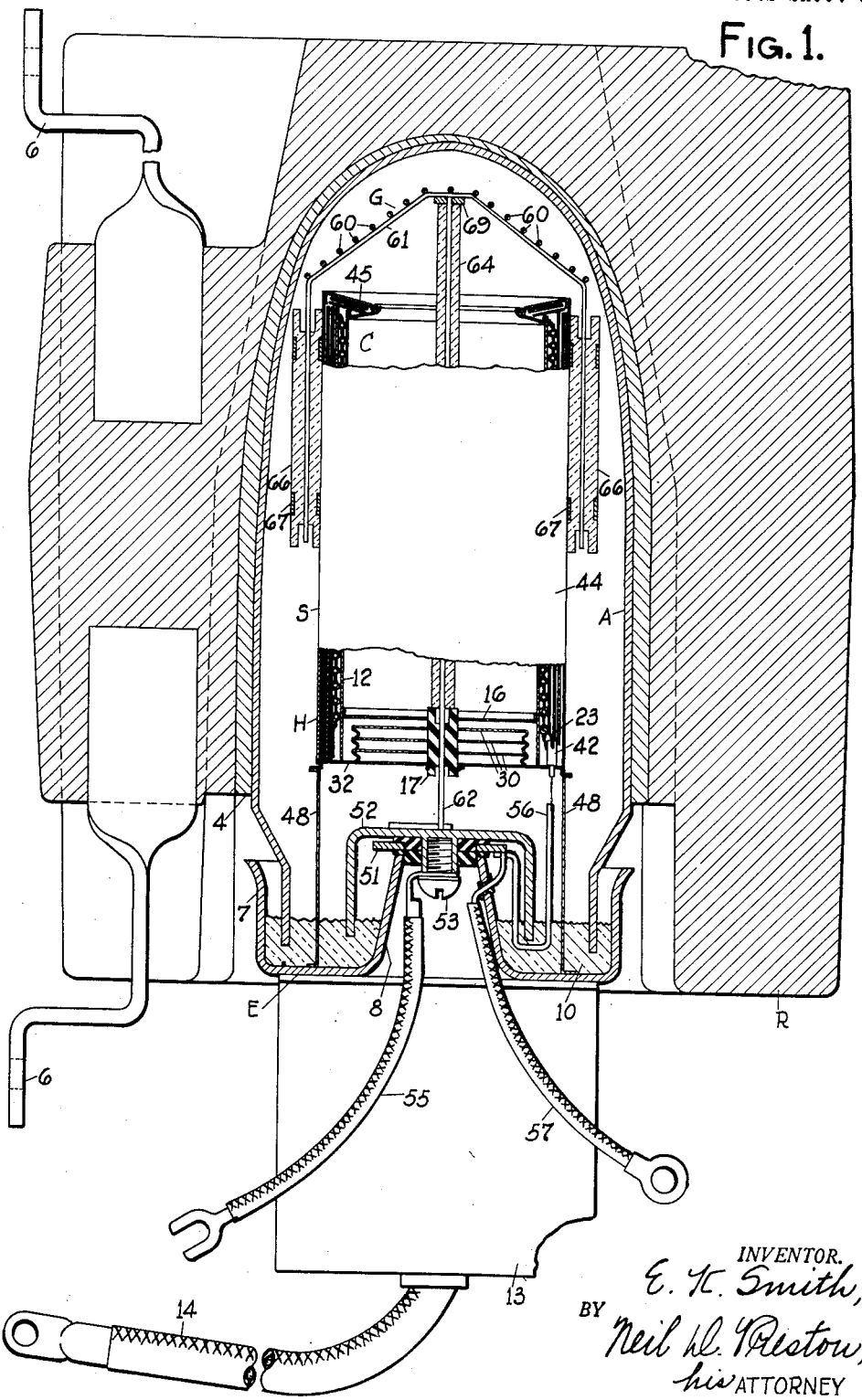
Fig. 1 is a general longitudinal section through the tube and its associated radiator.

In the specific embodiment of the invention illustrated, the anode A is dome-shaped in the general shape of a conoid, such as a paraboloid, as indicated by the section shown in Fig. 1; and this anode constitutes the curved end and side walls of a metal envelope for the tube. This anode A is made of a metal having the requisite strength and capable of forming a seal with a vitreous or like sealing composition, so that the anode may be sealed to another element to form a metal envelope, which may be thoroughly degassed, and has the appropriate insulation between external leads. A tube of this type is disclosed for example in the prior patent to D. V. Edwards, No. 2,173,473, September 19, 1939. In the preferred construction such as illustrated, the anode A is formed by a spinning or like metal shaping operation from a sheet of cold rolled steel, but may be cast or forged. The anode A is also plated on its interior surface with a thin but uniform and homogeneous coating or chromium by a conventional electro-plating process, for reasons more conveniently explained later.

Figure 3:
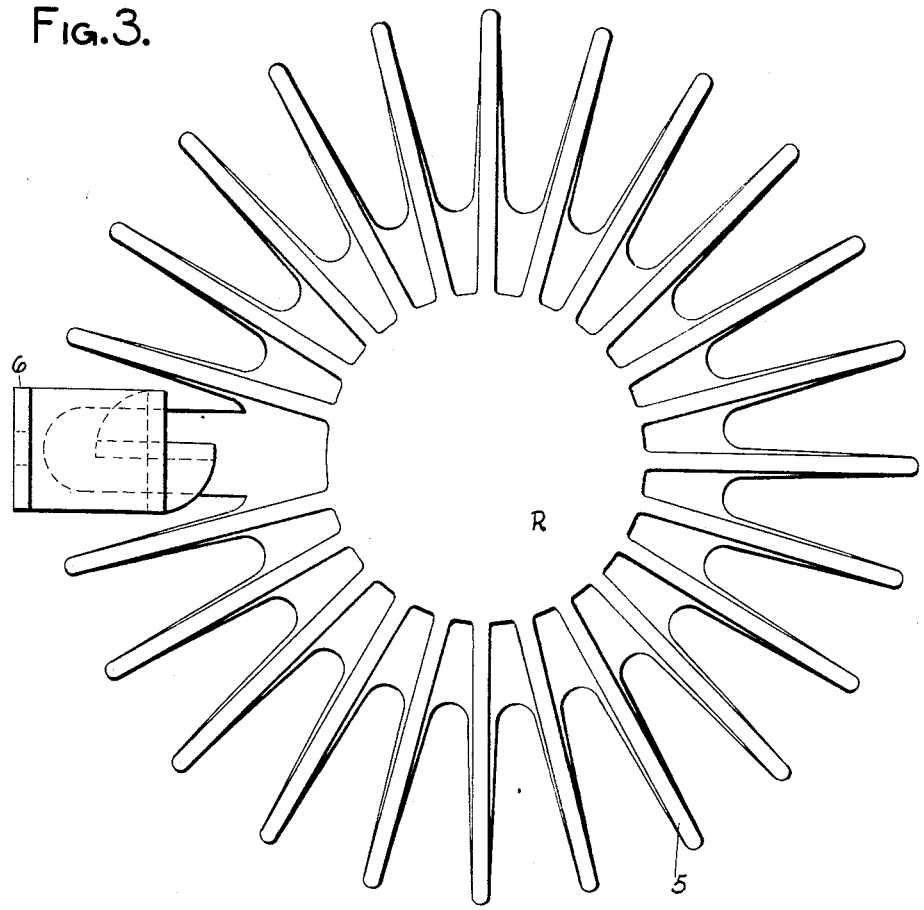
Fig. 3 is a top view of the radiator.

In order to dissipate heat from the anode most effectively by air cooling, its exterior surface is corrugated or formed with cooling fins to increase the surface radiation. As shown a separate radiator R with radiating fins 5 (see Fig. 3) is secured around the anode A with such intimate metallic contact as to permit ready conduction of heat from the anode to the body of this radiator. In the preferred construction, the radiator R is made of aluminum, or a similar metal or alloy having good heat conductivity and a coefficient of thermal expansion somewhat greater than the anode A. The radiating fins 5 may be cast as a part of this radiator body, or may be formed of a different metal, such as copper, suitably attached to this body. In order to obtain the desired intimate contact between the anode A and the body of its surrounding radiator R for ready conduction of heat, it is desirable to set up radial stresses in the radiator to cooperate with some other soft metal, such as tin or zinc, so as to fill all of the voids and spaces and obtain an intimate metallic contact at all points. One suitable procedure for this purpose involves heating the radiator R with its cavity to receive the dome-shaped anode turned upside down; and then a suitable metal of a lower melting temperature than either of the radiator or anode, such as tin, is melted and poured into the cavity of the radiator, after which the anode is forced down into the molten metal and held solidly in place until this metal indicated at 4 in Fig. 1 has solidified. During the cooling of the parts, the radiator body with its higher coefficient of thermal expansion contracts around the anode and exerts radial pressures tending to force the tin into all pores and crevices in the surfaces of the radiator body and anode, thereby establishing very close and intimate metallic contact at all points to permit ready transmission of heat by conduction from the anode to the radiator body. Electrical connections to the anode A are conveniently provided by suitable lugs 6 of copper or the like, which are attached to the radiator body by casting or otherwise.

The lower end of the dome-shaped anode A is closed by a metal cap or cup E with a vitreous seal, so as to form a complete envelope or enclosure of metal for the tube. In the preferred arrangement illustrated, this end cup E, which is of the same material as the anode A, is formed with a peripheral flange 7 and a central hollow projecting portion or upstanding boss 8, so as to provide a peripheral trough for holding the vitreous sealing material, indicated at 10. Assuming the anode A and the end cup E are made of iron or steel, the desired vitreous seal may be made of glass of a composition such as disclosed in the prior patent to D. V. Edwards, No. 2,175,019, October 3, 1939. In a tube of this type, the appropriate exhaust, degassing and gas filling procedure is carried out with suitable equipment, such as disclosed in the prior patent to D. V. Edwards, No. 2,223,031, November 26, 1940, with the anode A raised above and separated from the end cup E, and then the anode A is lowered into this end cup E with its trough partially filled with the molten sealing glass, thereby forming the final sealed metal envelope when the glass seal has cooled.

In order to form a tube envelope in this manner, which is particularly adapted for thoroughly degassing all of the parts, it is necessary to employ for the anode A a metal such as iron suitable for forming the proper vitreous seal with the end cup E; but a metal such as iron adapted for such sealing purposes has limitations as a material for an anode surface in a tube of this type. Among other things, there is a tendency for evaporation of metal from such an iron anode when heated to the high temperatures suitable for adequate degassing procedure; and such evaporated iron has a deleterious or poisoning action upon the oxide coating for the cathode. Also, an iron anode at the temperature it assumes in operation for tubes of the type contemplated, becomes so emissive as to interfere with the proper operation of the tube and materially shorten its life. Accordingly, the anode A in the tube of this invention is provided on its interior surface with a plating of chromium, which not only serves to obviate vaporization of the iron during the degassing procedure, since the vaporization temperature of chromium is higher than that of iron, but also forms a surface which is materially less emissive at the same operating temperature.

The increase in the useful tube life, obtained by employing a coating of chromium on the active surface of an iron anode, is attributed to the reduction of electron emission from the anode for the same operating temperature, and less ionic bombardment of the anode. Emission of electrons from the anode during the time an inverse or negative voltage exists on the anode tends to create gas ions in the region adjacent the anode, and these gas ions cause ionic bombardment of the anode under the influence of the relatively high positive potential which the anode may attain immediately after the formation of such gas ions. Extensive life tests under controlled conditions indicate that excessive ionic bombardment of the anode is a factor contributing to the action or effect in gas filled tubes, conveniently termed gas clean up, which causes in time the operation of the tube to become erratic and ultimately fail due to a reduction in the pressure of the gas filling. It is believed that excessive ionic bombardment of the anode acts in some way to reduce the molecular density of the gas filling by trapping or absorbing gas molecules at the surfaces of the anode, or perhaps by sputtering anode material to trap gas molecules on other surfaces within the tube envelope. A reduction in ionic bombardment of the anode materially increases the useful life of a gas filled tube; and since electron emission from the anode is a factor in connection with such ionic bombardment, it is desirable to plate the interior active surface of the iron anode of the tube of this invention with chromium, which for the same operating temperature is less emissive than iron, more particularly if the surface is contaminated with material sputtered or evaporated from the cathode coating.

Although a coating of chromium is preferred for this purpose, since a coating of the desired uniformity may be readily obtained by an electroplating process with this metal, coatings of other metals of like characteristics, such as molybdenum, tungsten or the like, may be employed in accordance with this invention, which in general contemplates a coating or layer of a metal having reduced emissivity for the same operating temperature, as compared with the iron or other material that is used for the anode to form the vitreous seal.

The tube envelope, formed by the dome-shaped anode A and the end cup E, encloses a heat shielded thermionic emissive cathode C of the oxide coated type and a suitable control grid G. In the preferred arrangement illustrated, the cathode C is in the form of a sheet metal cylinder 12 of appropriate dimensions, such as nickel, which is oxide coated on its surface and is indirectly heated by a heater coil H, is surrounded and supported by a heat shield S having a discharge opening in one end opposite the curved end of the anode A. The heat shield S, which comprises a suitable arrangement of spaced metallic walls to have the desired heat insulated properties, has electrically connected to it the cathode cylinder C and at one end of the heater coil H; and the heat shield S in turn is supported by and electrically connected to the end cup E, which is insulated from the anode A by the vitreous seal. The other end of the heater coil H and also the control grid G have separate lead-in connections insulated from each other and from the anode A by the vitreous seal and extending to the outside of the envelope. One or more plates 13 welded to the end cup E as shown in Fig. 1 serve to provide an extra heat radiating surface for this end cup; and the conductor 14 constituting the cathode connection is conveniently attached to these plates.

Figure 2:
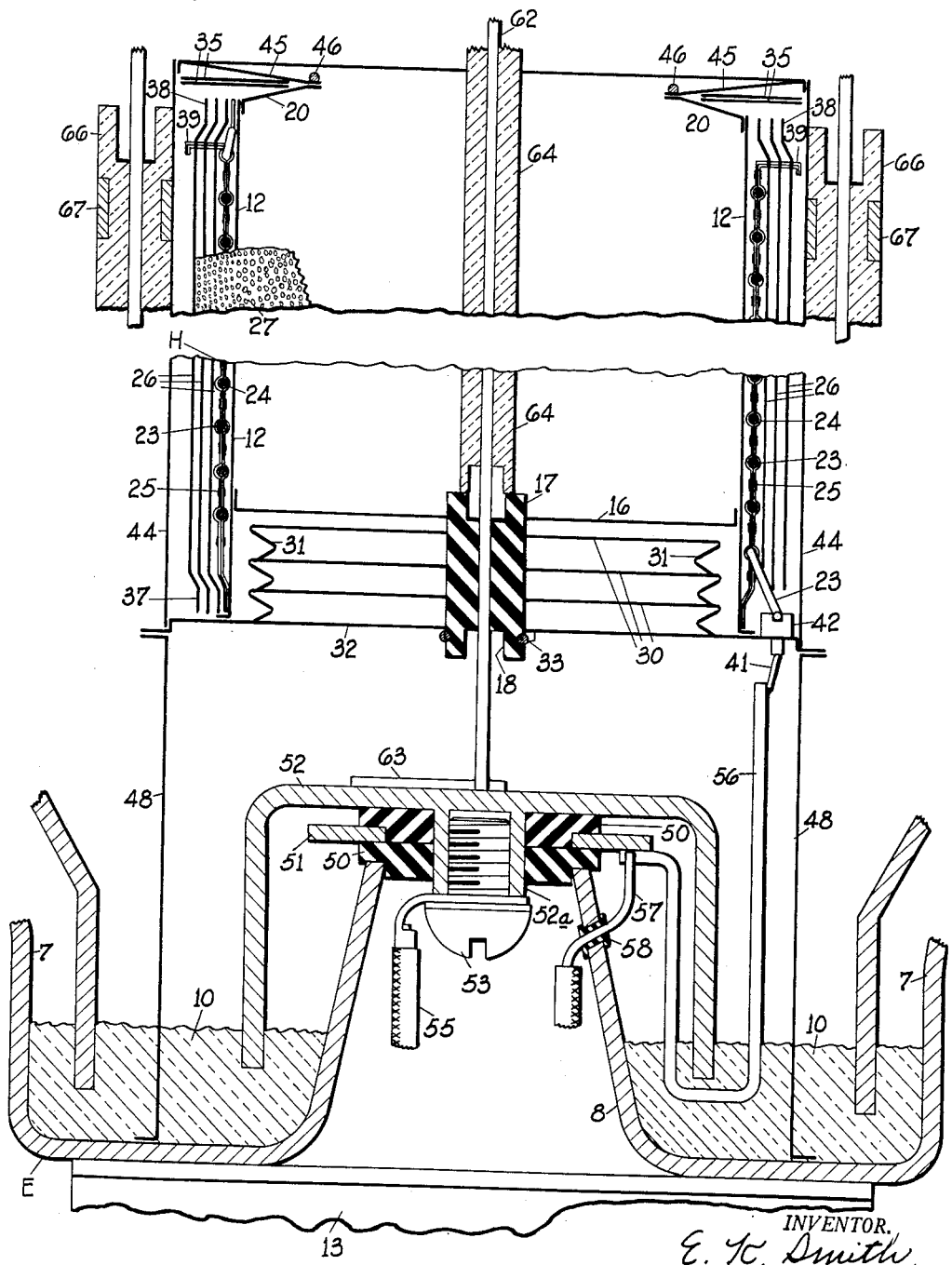
Fig. 2 is a schematic representation in the form of an enlarged longitudinal section through the heat shielded cathode and lower part of the tube envelope to illustrate somewhat diagrammatically the arrangement and interconnection of parts, certain parts of sheet metal being shown as single lines and spread apart to facilitate an explanation or understanding of the structure.

Considering more in detail the particular structure of the heat shield S and cathode C as illustrated in Fig. 1, Fig. 2 represents schematically the functional arrangement and interconnection between the parts, which in the interests of clarity has been shown separated with sheet metal parts represented by single lines. The sheet metal cylinder 12 constituted in the cathode C has a partition or false bottom 16 near its lower end attached by welding a peripheral flange thereon to the walls of the cathode C. This bottom 16 of the cathode C has a central hole to receive with a snug fit a tubular insulator 17 of steatite or like heat resistant ceramic insulating material, which is formed with deep cylindrical recesses 18 in its ends for reasons later discussed. An annular top 20 for the cylindrical cathode C, having a central discharge opening, has its peripheral flange welded to the upper end of the cathode cylinder. At a convenient stage in the fabrication of the tube the upper surface of the bottom 16 and the inner wall of the cathode cylinder 12 are coated with an oxide coating which is preferably formed and treated in accordance with the prior patents to D. V. Edwards et al. No. 1,985,855, December 25, 1934, and No. 2,081,864, May 27, 1937.

The heater coil H for indirectly heating the cathode cylinder C comprises a number of turns of wire 23 spirally wound around this cylinder with appropriate spacing between turns. This heater wire 23 is preferably formed of tungsten coated with a heat resistant insulating material such as aluminum oxide. The turns of the heater wire are maintained in its proper space relation for even heating of the cathode cylinder C, even though this heater wire becomes hot and expands in length, by pairs of narrow metal strips 24 preferably four in number, which are disposed vertically at spaced points around the heater coil, with the strips of each pair located respectively inside and outside of the turns of the heater wire and welded together between the turns, as indicated at 25 in Fig. 2.

The heater coil H is surrounded by a number of spaced metallic walls to reduce radiation and conduction of heat to the outside of the heat shield S. In the arrangement shown, a sheet 26 of nickel having closely and irregularly spaced bosses or pimples, as indicated at 27, formed therein by any suitable punching process, is wrapped around the heater coil a number of times, three as shown, so as to constitute in effect three concentric cylindrical walls separated or spaced apart slightly by the pimples in this sheet. Similar heat insulation for the bottom of the cathode C is provided by a number of annular discs 28 of sheet nickel having a central hole for the tubular insulator 17. These discs 30 are provided with a number of radial tabs which are bent under the disc and given a V-shaped bend, as indicated at 31 in Fig. 2, to act as separators or spacers for the adjacent sheet. These discs 30, which may also be pimpled, are interposed between the bottom 16 of the cathode cylinder and a bottom 32 of the heat shield S, to which a peripheral flange on the cathode cylinder 12 is welded. This bottom 32 of the heat shield S has a central hole to receive the insulator 17 for the grid support later described. In the arrangement shown this insulator 17 is formed with a circumferential groove near its lower end; and a wire or strip 33 seated in this groove has its ends welded to the bottom 32 of the heat shield S, so as to hold the insulator 17 in place. Similar annular discs 35 of pimpled sheet metal are provided for the upper end of the cathode cylinder C.

The lower edges of the wrapping or layers of pimpled sheet 26 around the cathode cylinder C, together with the lower ends of the pairs of strips 24 for supporting the turns of the heater wire 23, are preferably welded to the cathode cylinder 12 at spaced points as indicated at 37 in Fig. 2, so as to anchor these parts in place. The upper edges of the layers of the pimpled sheet 26 are similarly anchored to the cathode cylinder 12 by welding operation, together with the upper end of the wire 23 of the heater coil, as indicated at 38 in Fig. 2. The upper ends of the pairs of strips 24 for supporting the turns of the heater wire 23 are supported for sliding movement to take care of expansion; and in the arrangement shown, these ends are hooked over a slot in the wrapping of the pimpled sheet, as indicated at 39 in Fig. 2.

Considering the provisions made for a separate external connection to the lower end of the heater coil H in the particular structure illustrated, the wire 23 at the lower end of this heater coil is attached to a connecting wire 41 supported by an insulator block 42 of steatite or the like, which is preferably formed with a slot to receive the end of the heater wire, and has a hollow portion extending through a hole in the bottom 32 of the heat shield S. This insulator block 42 is preferably anchored by a suitable tap or clip not shown to the bottom 32.

After the heater coil H and heat insulating pimpled sheet 26 have been assembled and fastened together, the outer can or cylinder 44 for heat shield S is welded along its lower edge to the flanged portion of its bottom 32. A cap or cover 45 for the outer heat shield can 44, having a central discharge opening, is attached by a welded flange to the upper edge of the heat shield can 44; and the inner edges of this cover 45 and the cover 20 for the cathode cylinder 12 around the discharge opening are welded together, using if desired a reinforcing ring 46.

The structure so far considered constitutes a unitary assembly of a cathode C, heater coil H and a heat shield S; and this assembly is attached to and supported by the end cup E of the tube envelope, with appropriate provision for insulating the lead-in connections for the grid and heater coil. This supporting and connecting function is performed by a supporting cylinder 48 having a peripheral flange at the bottom welded to the end cup E and a peripheral flange at the top for a welded connection to the edge of the bottom 32 of the heat shield S. The end cup E is formed with a central annular boss or raised portion 8 with a circular opening at the top; and a pair of annular insulators 50 of steatite or the like are disposed on opposite sides of a metallic ring or washer 51, and are fitted over this opening in this raised portion of the end cup E. A grid supporting cap 52 in the form of an inverted cup of iron or other metal the same as the anode A, is provided with a central screw threaded stud 52a. This grid supporting cap 52 fits over the central raised portion 8 of the end cup E, with its lower edge in the vitreous sealing material 10, and a screw 53 threaded into the stud 52a serves to hold the grid supporting cap 52 in place, drawing together the insulators 50 and the metallic washer 51, and also attaching to this grid supporting cap a terminal for the grid wire 55.

To provide the external connection for the heater coil H a connector loop 56 of appropriate stiffness is welded at one end to the metallic washer 51, extends down under the lower edge of the grid supporting cap 52 through the vitreous sealing material 10 out of contact with the end cup E, and then projects upwardly to a convenient point for forming a welded connection to the connecting wire 41 for the heater coil. A wire 57, attached to this heater coil connector loop 56 and extending through a small steatite bushing 58 in a hole in the raised portion 8 of the end cup E affords an external connection to the heater coil H.

Figure 4:
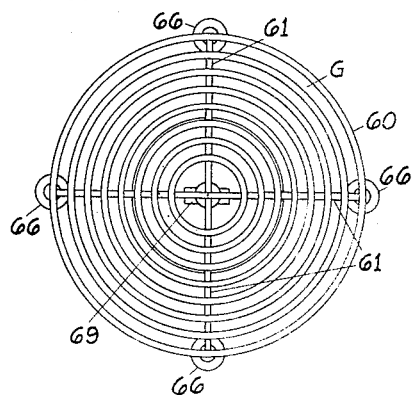
Fig. 4 is an end or top view of the grid.

The control grid G comprises a body portion consisting of a plurality of spaced grid bars disposed in a conical or convex surface conforming generally with the contour of the curved end of the anode A, together with suitable insulated supporting elements for this grid body. As shown, the body portion of the grid G comprises a plurality of concentric rings 60, as best shown in Fig. 4, which are attached at the proper spaced intervals to a pair of cross members 61 arranged at right angles and having prolonged down turned ends. This body portion of the grid G is supported at its center by a metallic post 62 which extends down through the heat shield S and the tubular insulator 17 in its bottom to the grid supporting cap 52, to which it is welded by a suitable tab or projecting element 63. This central support grid post 62 is surrounded throughout its length by an insulating sleeve 64 of quartz, steatite, or the like, which is preferably recessed at its lower end where it contacts with the upper end of the tubular insulator 17 for reasons later explained.

The body portion of the grid G is also supported against sidewise displacement from the heat shield S. Tubular insulators 66 of steatite or the like, formed with cylindrical recesses in the ends, are attached to the outer can 44 of the heat shield S at four spaced points; and the downwardly projecting end portions of the cross members 61 for the body of the grid G have a close but slidable fit in these insulators. For attaching the tubular insulators 66 to the heat shield, each insulator is formed with upper and lower peripheral grooves, and a metallic band or strip 67 seated in each of these recesses is welded to the outer can 44 of the heat shield.

The cylindrical recesses in the upper and lower ends of these grid supporting insulators 66, similar to those mentioned in connection with the ends of the tubular insulator 17 through the bottom of the heat shield, and in the end of the insulating sleeve 64 around the grid supporting post 62, are formed to be relatively deep as compared with their width. Recesses of this type are needed for the insulating elements in a tube structure of the type contemplated, because during the degassing and exhaust procedure, vaporization of metal parts within the envelope, particularly those of nickel, tends to deposit on the surface of any such insulating element and form a film or layer of insulating metal that will afford sufficient surface leakage to nullify the insulating effects of the insulator. It is found that a cylindrical recess at the ends of the insulated elements, with sufficient depth with respect to its widths and the dimensions of the metal rod through the insulator, will serve to shield enough of the walls or ends of such recesses from the deposit of evaporated metal that there is not enough continuity or density in the film or layer of metal to afford sufficient surface leakage to detract from the desired insulation of the parts. Insulators having these structural and functional characteristics are disclosed and claimed in my prior application Ser. No. 674,953, filed November 7, 1946, now Patent No. 2,456,540, December 14, 1948; and no claim is made in here to such insulator structures separately from the organization or combination disclosed.

In assembling the tube structure above described, the grid supporting cap 52 is secured to the end cup E of the envelope by the screw 53, and the grid supporting post 62 is fastened to this cap. The supporting cylinder 48 is welded to the end cup E of the envelope, and the appropriate amount of the vitreous material 10 in powder form is put in the trough of this end cup E inside of this supporting cylinder 48 so as to form the proper vitreous seal when later heated. The cathode and heat shield assembly is slid down over the grid supporting post 62 to a point where the connector wire 41 for the lower end of the heater coil H may be welded to the supporting loop 56 with a small amount of slack. The heat shield S is then turned to take up this slack in this connector wire 41 as it is lowered into position on the supporting cylinder 48 and then welded in place. After the insulating sleeve 64 has been slipped on the grid supporting post 62, a suitable welding tab or bracket, such as indicated at 69 in Figs. 1 and 4, is attached to the upper end of this post; and then the grid body is assembled with its legs within the tubular insulators 66 fixed to the heat shield S, using the tab 69 to facilitate welding the body of the grid G to the grid supporting post 62.

After assembly, the tube structure is degassed and exhausted, and the cathode is activated in accordance with the disclosure in the prior patent above mentioned to D. V. Edwards, No. 2,223,031, November 26, 1940, and the envelope is filled with Xenon, or a similar rare gas at the appropriate pressure.

One of the problems in connection with providing a control grid for the type of tube contemplated is that the grid tends to become emissive at its relatively high operating temperature to a degree that it is no longer able to perform its controlling function. In this connection, it can be appreciated that excessive emission of electrons from the grid will tend to reduce the negative potential of the grid with respect to the cathode that the grid control circuit must maintain to prevent firing of the tube, such reduction in negative grid potential by grid emission being accentuated by the voltage drop in the resistor ordinarily included in the grid circuit. Also, excessive electron emission from the grid may cause sufficient ionization of the gas filling in the grid to anode space so that the grid loses its control over the firing of the tube.

Since electron emission from the grid depends upon its operating temperature and the nature of its surface, special expedients are adopted in the tube of this invention to obtain a reduced operating temperature for the grid and also provide a grid surface having a low degree of emissivity. With regard to the operating temperature of the grid, in a metal envelope tube of the type contemplated, the heat accumulated by the grid from the discharge and by radiation from the hot cathode cannot radiate directly to the outside of the tube, as in the case of a glass envelope. In the tube of this invention, the anode A is the medium by which heat may be dissipated to the outside of the tube, since heat may be readily conducted to the radiator R and dissipated to the surrounding air, which may be circulated by suitable forced draft equipment if desired. Accordingly, in accordance with this invention, the grid is shaped to conform generally with the curved end of the anode A, and is located as close to this surface as practicable and consistent with satisfactory control characteristics for the tube, so that heat may be most effectively radiated from the grid G to the anode A. In this connection, it should be understood that the spacing between the grid G and the anode A affects the spacing between the grid bars 60 suitable for providing the desired control ratio for the tube; and it is assumed that the appropriate spacing of grid bars will be selected as this grid to anode spacing is reduced to facilitate the dissipation of heat. Also the closer grid to anode spacing helps in reducing the deionization time and ionic bombardment of the anode desirable for certain applications of the tube.

In addition to facilitating radiation of heat from the grid G to reduce its operating temperature, the grid G in the tube of this invention is also provided with a surface coating or treatment tending to reduce its emissivity for the same operating temperature, and also provide good heat radiating surface. In other words, a grid coating is employed to give a better heat radiating surface and a resultant lower grid operating temperature, and also restrict or inhibit electron emission from the grid.

One type of grid coating suitable for this purpose consists of tungsten oxide, as disclosed in the prior patent to D. V. Edwards et al., No. 2,012,339, August 27, 1935. In one arrangement, the grid cross-members 61 and the concentric rings 60 forming the body of the grid, are formed of tungsten, and a suitable coating of tungsten oxide is formed on these parts by an oxidizing process, such as by heating the parts in air. If it is desired to use a more ductile metal than tungsten, such as nickel for example, in order to facilitate the shaping and assembly of the cross members and rings constituting the grid body, tungsten oxide power with a suitable binder, such as nitro-cellulose, in the form of a pasty mixture, may be applied by dipping, brushing or spraying to the parts, and then baked on the metal surfaces by the application of heat.

Another type of grid coating consists essentially of a sulphate of chromium on a grid of nickel or other metal suitable for convenient fabrication of the parts. This coating may be provided by adding commercially pure chromic sulphate to alcohol or dilute sulphuric acid to form a mixture of pasty consistency in which excess chromic sulphate is held in suspension. This mixture may be applied to the exposed surfaces of the grid by dipping it in the mixture at room temperature while being constantly stirred, or the mixture may be applied by a suitable dipping, brushing or spraying process. It is important to obtain a uniform distribution or wetting of all of the metal surfaces with a mixture having sufficient density of chromic sulphate, in order that the residual coating will be uniform and consistent over all the exposed area of the grid; and the nature of the mixture and mode of application should satisfy this requirement. After the mixture including chromic sulphate has been applied to the exposed grid surface, heat is applied by baking or otherwise to drive off the volatiles from the alcohol or sulphuric acid used in the mixture, and leave a residual coating consisting primarily of sulphate of chromium. It is found that such chromium sulphate is a poor emitter of electrons even at the relatively high temperature the grid may assume in operation, and also similar to tungsten oxide apparently has a poisoning effect upon any emissive material that might be sputtered on the grid from the cathode during the process of exhaust and activation of the cathode, or in subsequent operation of the tube. The process of forming this coating of a sulphate of chromium is disclosed and claimed in my copending application Ser. No. 115,103, filed September 10, 1949, and a grid or other electrode so coated is disclosed and claimed in my other application Ser. No. 115,102, filed September 10, 1949; and no claim is made herein to such process or coated grid as a separate element aside from a combination involving such a coated grid.

The coating or surface treatment for the control grid G in accordance with this invention serves to reduce electron emission from the grid at its relatively high operating temperature to a level where the grid will perform its desired control function. Such coatings also constitute surfaces having superior heat radiating qualities, as compared with an untreated metallic surface for the grid, and thus serves to facilitate radiation of heat from the grid to the anode A and reduce its operating temperature.

The central supporting post 62 for the grid G, which extends through the cathode C and heat shield S, receives heat from the cathode and tends to assume a high temperature in operation of the tube. Electron emission from this grid supporting post 62 at such a high operating temperature tends to reduce the negative potential on the grid and prevent it from performing its controlling function the same as electron emission from the body of the grid. Also, it is convenient and common practice to employ alternating grid voltages for gas tubes of the type contemplated, and electrons emitted from the cathode and drawn to the grid supporting post 62 during the time the grid is positive with respect to the cathode, would tend to cause ionization and initiate a discharge within the cathode, thereby causing the tube to fire when the anode becomes positive and before the grid could assume its full negative value. For these reasons, the supporting post 62 in the tube of this invention is surrounded by the insulating sleeve 64 of quartz or steatite throughout the exposed length, so that there can be no movement of electrons to or from this post to interfere with the proper operation of the tube.

In the tube structure of this invention, the supporting cylinder 48, on which the cathode and heat shield assembly is mounted, not only serves to support and electrically connect this assembly to the end cap E of the tube envelope, but also provides in effect an enclosed chamber for the exposed end of the grid supporting post 62 and associated end cap 52 and the exposed connections to the lower end of the heater coil H. Consequently, the gas filling in this chamber does not become ionized during discharge of the tube to permit differences of potential between the elements within this chamber to establish or maintain a discharge that would otherwise interfere with the proper functioning of the parts. If, for example, a discharge should occur from the lower end of the heater coil H to the bottom 32 of the heat shield, due to the difference in potential represented by the heater voltage used, this would in effect short circuit the heater coil, overload the heater circuit, and perhaps burn out the electrical connections.

Another significant characteristic of the structural arrangement characteristic of this invention is that the separate lead-in connections for the grid G and heater coil H, represented by wires 55 and 57, are wholly enclosed by the supporting cap 52 for the grid, which has the appropriate gas tight seal with the sealing material 10, so that the insulating supports for these lead-in connections need not be gas tight. In this connection, it is apparent that the degassing of the metal parts of the tube envelope, prior to the formation of the vitreous seal 10, enables all of these parts to be raised to temperatures for thorough degassing much higher than the temperature at which the sealing material indicated at 10 would become molten and no longer maintain a vacuum. In other words, parts associated with the vitreous seal, such as, for example, the supporting cylinder 48, are so thoroughly degassed in the fabrication of the tube that it is unnecessary, as in the conventional metal envelope exhausted after the seal has been formed, to employ such dimensions and cooling facilities that such parts will be kept sufficiently cool during operation to avoid giving out gas.

From the foregoing it can be seen that this invention provides a structural organization and arrangement of parts suitable for air cooled grid control gas filled tubes for the higher range of continuous current ratings, since the disposition of parts and the surface coatings for the anode and grid enable satisfactory control and tube operation to be obtained in an environment of high operating temperatures characteristic of the tubes of the higher continuous current ratings.

Various adaptations, modifications and additions may be made in the particular structure illustrated and described without departing from the invention.

What I claim is:

1. A grid control gas tube comprising, a dome shaped anode constituting the end and sidewalls of a metallic envelope for the tube, a thermionic emissive cathode within said envelope having an extensive emissive surface, a heat shield around said cathode having a discharge opening in one end opposite the curved end of said anode, and a control grid interposed between said anode and said discharge opening and substantially larger than said discharge opening, said grid comprising spaced grid bars disposed in a curved surface conforming generally with the surface of the anode opposite to said grid and spaced relatively close thereto, thereby facilitating radiation of heat from the grid to said anode, said grid bars being spaced to provide openings of a dimension dependent upon the grid to anode spacing to enable said grid to control initiation of cumulative ionization of the gas filling in the envelope.

2. A grid control gas tube comprising, a dome shaped anode constituting part of the metallic envelope for the tube, a heat-shielded cathode for providing electrons to ionize the gas filling of the tube and give large anode currents with a low arc drop, and a control grid between said cathode and said anode and comprising a plurality of concentric circular grid bars spaced apart a distance greater than the mean free path of the gas in the gas filling of the tube, said grid bars being disposed in a conical surface conforming generally with the curvature of the opposing anode surface and spaced relatively close thereto, said grid having a surface of better heat radiating qualities than a plain surface of the grid metal, whereby heat may be efficiently radiated from the grid to said anode.

3. A gas tube comprising an anode of a paraboloid form constituting the end and sidewalls of a metallic envelope for the tube, a radiator for dissipating heat from said anode, a thermionic emissive cathode and cylindrical heat shield within said anode, said heat shield having a discharge opening opposite the curved end of said anode, and a conical grid interposed between said discharge opening of the heat shield and said anode and spaced relatively close to said anode to facilitate radiation of heat from the grid to said anode, said grid having openings of a dimension dependent upon the grid to anode spacing to enable said grid to perform its controlling functions, said grid having a coating on its exposed surface having greater heat radiating ability and less electron emissivity for the same operating temperature than the plain metal used for the grid.

4. A grid control gas tube comprising an anode in the general form of a paraboloid and constituting the end and sidewalls of a metallic envelope for the tube, a heat shield and a thermionic emissive cathode within said anode, said heat shield having a discharge opening therein opposite the curved end of the anode, a control grid comprising a plurality of spaced grid bars disposed in a surface conforming generally with the curved surface of the anode, and a metallic end cup closing the open end of said anode with a vitreous seal and constituting a support for the cathode, heat shield and grid.

5. A grid control gas tube for large currents comprising a dome shaped anode constituting the end and sidewalls of a metallic envelope for the tube, a metallic end cup having a vitreous seal with the open end of said anode, a cathode of cylindrical form having an extensive oxide coated emissive surface, an indirect heater around said cathode, a multiple wall heat shield surrounding said cathode and heater except for a discharge opening in one end opposite the curved end of the anode of the tube, and a control grid of conical shape interposed between said discharge opening in the heat shield and the curved end of said anode, said end cup of the envelope supporting said heat shield and grid with separate insulated lead-in connections for said grid and heater.

6. A grid control gas tube comprising a cathode of cylindrical form having on its interior surface a thermionic emissive oxide coating, a heater for said cathode comprising turns of wire coated with a heat resistant insulating material wrapped around said cathode, means for maintaining a space relation between said turns of wire at a plurality of points, a multiple wall heat shield surrounding said cathode except for a discharge opening at one end, one end of the heater wire being connected to said heat shield, a control grid opposite said discharge opening and comprising a plurality of bars spaced apart a distance several times the mean free path of the gas in the gas filling of the tube, said grid bars having a uniform coating of a material to render said grid substantially non-emissive at relatively high temperatures, means including insulators attached to said heat shield for supporting said grid.

7. A grid control gas tube comprising a cathode, a dome shaped anode constituting an end and sidewalls of a metallic envelope for the tube, said anode being of iron with a plating of chromium on its interior surface, and a control grid comprising spaced bars disposed in a surface conforming generally with the curved end surface of said anode, said grid bars having a uniform coating of a material to reduce electron emission from the grid.

8. A grid control gas tube comprising a thermionic emissive cathode, a heat shield around said cathode having a discharge opening therein, an anode, a control grid for governing the movement of electrons from the cathode through the discharge opening of said heat shield to said anode, and means for supporting said grid including a supporting post extending along the axis of said heat shield and through its closed end, said supporting post being surrounded by a heat resistant non-conductive material to insulate said post from said heat shield and from electrons emitted by the cathode.

9. A grid control gas filled tube comprising a cylindrical heat shield enclosing a thermionic emissive cathode and having a discharge opening, a control grid opposite said discharge opening, a central supporting post for said grid extending axially through the heat shield and surrounded by a sleeve of heat resistant insulating material, and a plurality of supports for the outer edge of said grid each comprising a rod having a slidable fit within a steatite sleeve anchored to said heat shield, said steatite sleeves having relatively deep recesses in their ends around said rods.

10. A grid control gas tube comprising an anode, a cylindrical heat shield enclosing a thermionic emissive cathode and having a discharge opening in one end opposite said anode, a grid of circular form overlying said discharge opening and comprising a plurality of spaced grid bars in a surface conforming generally with the surface of said anode and closely spaced thereto, a central supporting rod for said grid extending along said axis of said heat shield and through its closed end, said rod being surrounded by an insulator of heat resistant insulating material where it passes through the closed end of said heat shield, said rod being also covered with a heat resistant non-conductive and non-emissive material throughout its length within said heat shield, and means including heat resistant insulating elements attached to said heat shield for supporting said grid at a plurality of points around its periphery.

11. A grid control gas tube comprising a dome shaped anode, an end cup for the open end of said anode having a trough to hold a vitreous sealing material, said anode and end cup being of a metal suitable for forming a seal with said vitreous sealing material, a heat shielded cathode having one end of its heating circuit connected to said end cup, a control grid disposed between said cathode and the curved end of said anode, separate insulated connections to the outside of the tube envelope for the other end of the heating circuit of said cathode and for said control grid respectively extending through said end cup, and an inverted cap supporting said control grid and covering said external connections, said cap having its periphery sealed in said sealing material.

12. A gaseous electron discharge tube comprising a hollow cathode of cylindrical form having on its interior surface a thermionic emissive oxide coating, a heater for said cathode comprising wire with a heat resistant insulating coating wound on the exterior of said cathode, a heat shield enclosing said cathode except for a discharge opening at one end, said heat shield including a number of metallic surfaces in spaced relation, a control grid opposite the discharge opening in said heat shield, and means for supporting said grid including a supporting post extending along the axis of said cathode and said heat shield, said supporting post being surrounded throughout its length by a sleeve of heat resistant insulating material and extending through a tubular insulator in the closed end of said heat shield.

13. A grid control gas tube comprising a dome shaped anode constituting the end and sidewalls of a metallic envelope for the tube, an end cup for the open end of said anode containing a body of vitreous material for forming a seal with said anode, a heat shield and a thermionic emissive cathode supported by said end cup within said anode, said heat shield having a discharge opening therein opposite the curved end of said anode, a control grid between said discharge opening and said anode, a supporting rod for said grid extending along the axis of said heat shield and surrounded by a sleeve of heat resistant insulating material, said grid supporting rod being attached to a cap anchored in said vitreous sealing material, and an external connection for said grid supporting rod to the outside of the tube en- 14. A grid control gas filled tube comprising a dome shaped anode of iron chromium plated on its interior surface and constituting a curved end and side walls for an envelope of the tube, an end cup of iron having a trough containing a vitreous sealing material for forming a seal with the open end of said anode, a heat shielded thermionic emissive cathode enclosed by said anode, and a control grid closely spaced to the curved end of said anode and supported by an element anchored in said vitreous sealing material, said control grid having a coating affording a better heat radiating surface and less electron emission at the same operating temperature than the untreated metal of the grid, said anode being plated on its interior surface with another metal having a higher vaporization temperature than iron and permitting heating of the anode to a temperature for adequately degassing without undue vaporization of metal from the surface of said anode.

15. A grid controlled gas filled tube comprising a dome shaped anode constituting the end and sidewalls of a metallic envelope for said tube, an end cup for the open end of said anode attached thereto by a vitreous seal, said anode being of iron to form the seal and being plated with chromium on its inner surface, a control grid within said anode closely spaced to its curved end and shaped to conform generally with the curvature of the opposing anode surface, said grid having on its exposed surface a uniform coating of tungsten oxide to reduce electron emission.

16. A grid control gas tube comprising a heat shielded cathode and a control grid, an anode surrounding said cathode and grid and made of a metal suitable for forming a seal with a vitreous sealing material, and a coating of another metal on the interior surface of said anode having a higher temperature of vaporization and lower electron emission for the same operating temperature than the metal of the anode, said coating preventing vaporization of metal from the surface of said anode when heated to a temperature for adequate degassing.

17. A gas tube comprising a heat shielded oxide coated cathode and a control grid, a dome shaped anode of iron constituting the curved end and sidewalls of a metallic envelope for the tube, an iron end cup for the open end of said anode attached thereto by a vitreous seal, and a radiator with cooling fins around said anode, said anode being chromium plated on its interior to avoid undue metal vaporization from the surface of the iron anode when it is heated to a degassing temperature and also to reduce its emission of electrons at the operating temperature it assumes.

18. A grid control gas filled tube comprising a heat shielded thermionic emissive cathode having a discharge opening, a control grid opposite said discharge opening, a central supporting post for said grid extending lengthwise through said heat shield and surrounded throughout its exposed length with a sleeve of heat resistant insulating material, and means including heat resistant insulators connected with the outer surface of said heat shield for also supporting said grid against sidewise displacement.

19. A grid control gas tube comprising a metal envelope formed of a dome-shaped anode and an end cup connected by vitreous sealing material, a heat shielded cathode within said anode and supported by said end cup, a control grid between said cathode and said anode, a hollow metallic member having its edges sealed in said sealing material around an opening in said end cup for supporting said control grid, and a lead-in connection for said control grid extending through said opening in said end cap and connected to the inside of said hollow member.

20. A grid control gas tube comprising a gas filled envelope of metal consisting of an anode and an end cup connected by a sealing material in a trough in said end cup, a heat shielded cathode within said anode supported by said end cup, a hollow member overlying an opening in said end cup and having its periphery sealed in said sealing material, a control grid between said cathode and anode supported by said hollow member, and a lead-in connection for said cathode extending through said sealing material to the interior of said hollow member.

21. A grid control gas tube comprising a cathode of cylindrical form having an oxide emissive coating on its interior surface, a heater around said cathode comprising a continuous conductor coated with heat resistant material and having its portions maintained in a predetermined space relation, a heat shield surrounding said cathode and heater except for a discharge opening at one end, said heat shield including multiple layers of thin metal sheets formed with pimples to maintain a separation between said sheets, an anode opposite the discharge opening in said heat shielded cathode, a control grid between said heat shielded cathode and anode, and means including heat resistant insulating elements attached to said heat shield for supporting said control grid.

22. A grid control gas tube comprising a cathode of a cylindrical form having a thermionic emissive oxide coating on its inner surface, a heater around said cathode, a multiple wall heat shield surrounding said cathode and heater except for a discharge opening at one end, a control grid opposite said discharge opening, a gas filled tube envelope containing and supporting said tube elements, a lead-in connection for one end of said cathode heater extending from the inside of said heat shield through a seal in said envelope, and means surrounding said lead-in connection to prevent ionization of the contiguous gas filling, whereby a heater voltage higher than the ionization potential for the gas filling may be employed without establishing a discharge with said lead-in connection.

23. A gaseous electron discharge tube comprising a hollow cylindrical cathode having on its interior surface a thermionic emissive oxide coating, an indirect heating element for said cathode including closely spaced turns of heat resistant insulated wire around said cathode, a multiple wall heat shield surrounding said heating element and cathode except for a discharge opening, one end of said heating element being electrically connected to said heat shield, a gas filled envelope enclosing said cathode heat shield and heating element, a lead-in connection for the other end of said heat element extending from said heat shield through a vitreous seal to the outside of said tube envelope, and a metallic cylinder welded to said heat shield and surrounding said lead-in connection for isolating the region including said lead-in connection from ionization of the gas filling in the envelope by currents conducted by the tube.

EARL K. SMITH.

(References on following page)

REFERENCES CITED

The following references are of record in the file of this patent:

UNITED STATES PATENTS

| Number | Name | Date |
|---|---|---|
| 1,871,363 | Fritz | Aug. 9, 1932 |
| 1,924,375 | Pike | Aug. 9, 1933 |
| 1,968,608 | Lowry | July 31, 1934 |
| 2,036,605 | Record | Apr. 7, 1936 |
| 2,111,506 | Edwards et al. | Mar. 15, 1938 |
| 2,118,594 | Douden | May 24, 1938 |
| 2,181,366 | Edwards et al. | Nov. 28, 1939 |
| 2,398,608 | Werner | Apr. 16, 1946 |
| 2,409,668 | Dailey | Oct. 22, 1946 |
| 2,417,461 | Becker | Mar. 18, 1947 |

FOREIGN PATENTS

| Number | Country | Date |
|---|---|---|
| 222,561 | Great Britain | Oct. 2, 1924 |

OTHER REFERENCES

Technical Bulletin, T$a$, 3902 by F. F. Hunter, Chief Engineer, Tantalum Division, Fansteel Metallurgical Corporation, 2200 Sheridan Road, North Chicago, Illinois.